United States Patent [19]
Veglia

[11] 3,770,992
[45] Nov. 6, 1973

[54] BEARING HAVING CLOSURE MEANS FOR CLOSING THE BEARING SEATING

[75] Inventor: Bartolomeo Veglia, Turin, Italy

[73] Assignee: Riv SKF Officine Di Villar Perosa S.P.A., Turin, Italy

[22] Filed: Feb. 28, 1971

[21] Appl. No.: 229,681

[30] Foreign Application Priority Data
Apr. 10, 1971 Italy.................68212A/71

[52] U.S. Cl.............................. 308/187.2, 308/245
[51] Int. Cl. ............................................ F16c 33/78
[58] Field of Search.................... 308/187.1, 187.2, 308/245

[56] References Cited
UNITED STATES PATENTS

| | | | |
|---|---|---|---|
| 2,044,380 | 6/1936 | Cobb | 308/187.1 |
| 3,519,316 | 7/1970 | Gothberg | 308/187.1 |
| 2,118,027 | 5/1938 | Barish | 308/187.1 |
| 3,010,771 | 11/1961 | Cogger | 308/187.2 |
| 3,090,628 | 5/1963 | Giulietti | 308/187.2 |

Primary Examiner—Charles J. Myhre
Assistant Examiner—Barry Grossman
Attorney—Richard C. Sughrue et al.

[57] ABSTRACT

A rolling element bearing having a sealing cover for closing the opening in a casing or housing in which the bearing is mounted to prevent the leakage of lubricant and to protect the bearing from dust and other foreign bodies. The cover is substantially disc like and has an annular rim which clips over the outer annular bearing member of the bearing and engages in an annular groove in the curved surface thereof. The cover also has a central portion slightly axially displaced from a peripheral portion so that no rubbing against the inner annular bearing element occurs when the bearing is in use, but the central portion is resiliently movable with respect to the peripheral portion so that the cover can be assembled to the bearing before the bearing is pressed onto a shaft so that the force can be applied through the central portion of the cover which moves to engage the inner bearing element during this operation and then returns to the normal position spaced from the inner bearing member.

3 Claims, 4 Drawing Figures

PATENTED NOV 6 1973 3,770,992

BEARING HAVING CLOSURE MEANS FOR CLOSING THE BEARING SEATING

BACKGROUND OF THE INVENTION

The present invention relates to rolling element bearings which are arranged for rotatably supporting a shaft in a fixed housing, and for sealing the opening in the housing of the engine or other machine in which it is fitted.

Generally these functions are performed by two separate elements, one which operates solely as a bearing and the other which operates solely as a seal; these elements have been either entirely separate or combined to provide a bearing having a shield in plastics or elastomeric material sliding on a ring and therefore causing frictional heat. Such shields have also been arranged to enclose part of the external cylindrical surface of the outer annular bearing member in order to prevent leakage between the bearing itself and the supporting hole in the housing.

It is also know from German Pat. No. 69,970 to provide a bearing with a complete closing element, which can be fitted to one side of the bearing after the outer annular bearing member has been pressed, with some considerable pressure, into a supporting housing, For the same purpose it is possible to use in a manner known per se bearings without inner bearing members, where the rolling elements engage directly on the shaft.

OBJECTS OF THE INVENTION

One object of this invention is to provide a bearing having an improved sealing system capable of providing a secure protection against the ingress of dust and foreign bodies into the bearing or into the interior of the engine or other machine on which the bearing is fitted and against leakage of lubricant, while avoiding the inconveniences of previously known solutions.

SUMMARY OF THE INVENTION

According to the present invention there is provided a rolling element bearing having inner and outer annular bearing members and means for sealing the shaft on which the bearing is mounted, characterised in that the bearing has a sustantially circular cover the peripheral portion of which has an annular channel with a C-shaped cross section which engages an annular groove in the outer annular bearing member of the bearing the cover including a substantially flat central part which is surrounded by an annular ridge between the said central part and the peripheral portion, the said central part lying in a plane which is displaced axially from the peripheral portion such that, when the peripheral portion is in engagement with the outer annular bearing member the central part is spaced from the inner annular bearing member.

It will be appreciated that embodiments of this invention can provide the sealing of the interior of the engine or other machine to which it is fitted, without requiring special auxiliary operations for fitting the bearing, apart from the usual operations for the mounting of simple bearings.

Various other features and advantages of the invention will become apparent during the course of the following description which is provided purely by way of non-restrictive example.

DESCRIPTION OF THE PREFERRED EMBODIMENT

Figure 1:
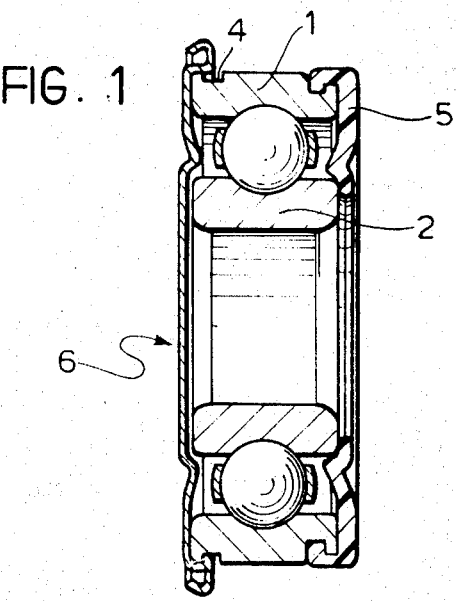
FIG. 1 is a schematic axial section of a rolling element bearing constructed as an embodiment of this invention.
Figure 2:
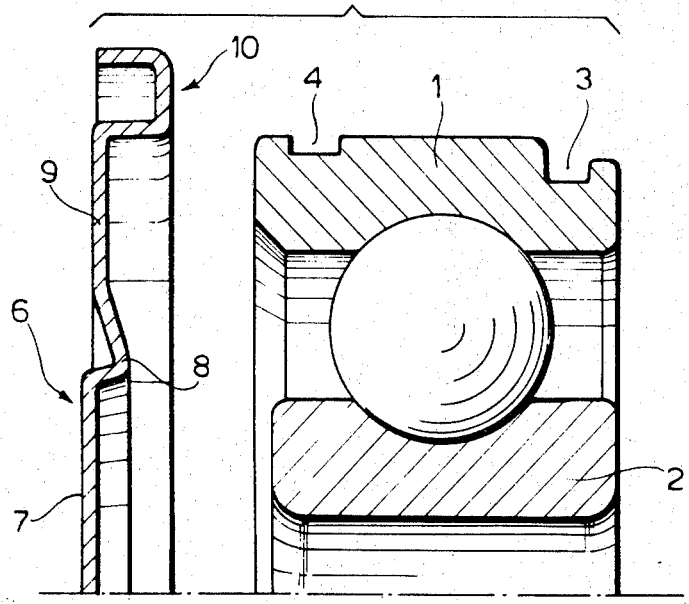
FIG. 2 is an enlarged, exploded, sectional view of part of the embodiment of FIG. 1.

Referring now to FIG. 1 there is shown a rolling element bearing having an outer annular bearing member 1 and an inner annular bearing member 2. The outer annular bearing member 1 is provided with an annular groove 4 in the outer cylindrical surface thereof, near to one side face of the bearing which, when the bearing is fitted in position in the housing of an engine or other machine, will face outwardly from the casing.

This outer face of the bearing is enclosed by a protection cover 6, formed from thin plate, which cover 6 has a central disc-like part 7, surrounded by an annular ridge 8 which lies between the central part 7 and a flat annular peripheral portion 9 the periphery of which has a channel 10 with a C-shaped cross section. The central part 7 of the cover 6 is displaced axially from the peripheral portion 9 by an amount in the region of the thickness of the plate.

During assembly of the bearing the peripheral channel 10 is fitted over the outer annular bearing member 2 and subsequently plastically deformed by a radial inward force so as to partly engage the annular groove 4 of the annular bearing member 1 illustrated in FIGS. 1, 3 and 4. After the assembly of the bearing, the annular portion 9 of the cover 6 engages against the side face of the outer annular bearing member 1, while the disc-like central portion 7 remains separated by a small distance from the inner annular bearing member 2 avoiding any danger of contact and therefore of rubbing between the two.

Figure 3:
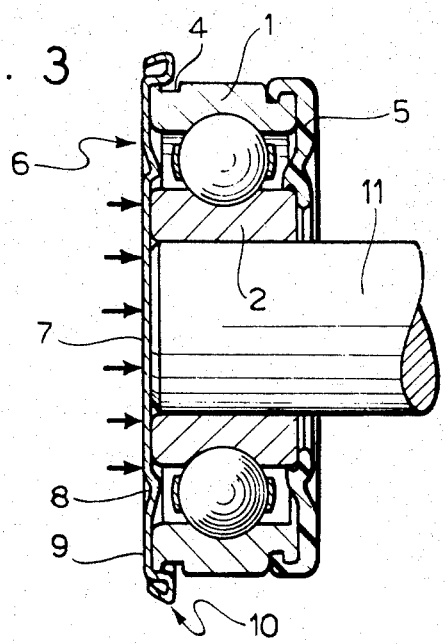
FIG. 3 is an axial sectional view of the embodiment of FIG. 1 showing the bearing being fitted to a shaft.

The annular ridge 8 provides the cover 6 with a certain degree of elasticity which allows the bearing to be mounted onto a shaft 11 in the usual way, as illustrated in FIG. 3, by applying a force directly through the central portion 7 of the cover 6 on to inner bearing member 2. When the bearing has been mounted onto the shaft the central portion 7 of the cover returns to its original position where it is separated from the inner bearing member 2 due to the elasticity provided by the annular groove 8.

Figure 4:
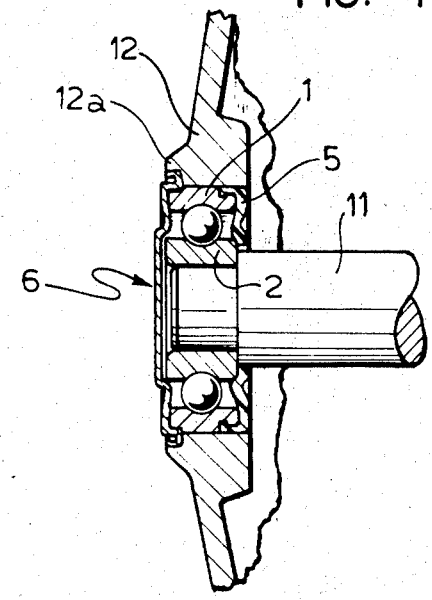
FIG. 4 is a schematic axial sectional view showing the embodiment of FIG. 1 in position on a shaft and mounted in a housing.

For mounting on the housing of a machine or engine it is necessary, as illustrated in FIG. 4 to provide the opening 12 for the bearing with an annular groove to receive the annular channel section periphery 10 of the cover 6. This goove can subsequently be plastically deformed, for example by pressing radially inwardly on a peripheral annular portion 12a to crimp the groove to retain the cover 6 and thus restrain the bearing against axial movement.

The bearing described above, as with known types of bearing can have on the inner side of the annular bearing members, a shield of elastomeric or similar material, which separates the inner face of the bearing from the engine or other machine to which the bearing is fitted. Such a shield is shown, for example, in FIG. 1 comprising an annular element 5 which is engaged in a second annular groove 3 of the outer annular bearing member 1 and projects slightly radially outwardly from the curved surface of the outer annular bearing member so that when the bearing is pressed into a housing the shield 5 is compressed to prevent the outer bearing member from rotating within the housing. The shield 5 can also be shaped to provide a certain amount of axial preloading to the bearing.

We claim:

1. In a rolling element bearing, said rolling element bearing comprising,
    an inner annular bearing member,
    an outer annular bearing member,
    rolling elements between said inner and said outer bearing members,
    the improvement comprising,
    an annular groove in the outer curved surface of said outer bearing member,
    a cover for sealing a shaft on which said bearing is mounted, said cover comprising a substantially circular disc-like member having,
    a substantially flat central portion,
    a peripheral portion axially displaced from said central portion,
    an annular ridge between said central portion and said peripheral portion said annular ridge allowing resilient axial movement between said central position and said peripheral portion, and
    an annular rim around said peripheral portion, said annular rim having a C-shaped cross section, said rim engaging in said annular groove in said outer bearing member with said peripheral portion abutting a side face of said outer bearing member, said ridge spaced radially from and between said inner and outer bearing members and said substantially flat central portion spaced axially from said inner bearing member.

2. The rolling element bearing of claim 1 wherein said rim of said peripheral portion of said cover extends radially from said outer bearing element to engage a cooperating annular recess in an opening in a housing in which said bearing is mounted to secure said cover and and said bearing against axial movement in said housing.

3. The bearing of claim 1 wherein the face remote from the face having said cover is provided with a second cover arranged to prevent rotation of said outer bearing member in said housing and to provide a slight axial preloading to said bearing, said second cover engaging in a second annular groove in said outer annular bearing member.

* * * * *